United States Patent [19]
Ono

[11] Patent Number: 5,414,550
[45] Date of Patent: May 9, 1995

[54] OPTICAL HETERODYNE DETECTOR AND RECEIVER

[75] Inventor: Takashi Ono, Tokyo, Japan

[73] Assignee: NEC Corporation, Tokyo, Japan

[21] Appl. No.: 52,902

[22] Filed: Apr. 27, 1993

[30] Foreign Application Priority Data

Apr. 27, 1992 [JP] Japan .................................. 4-108072

[51] Int. Cl.$^6$ ............................................ H04B 10/06
[52] U.S. Cl. ............................... 359/191; 359/192
[58] Field of Search ..................... 359/156, 189–192, 359/194–195

[56] References Cited

U.S. PATENT DOCUMENTS

| | | | |
|---|---|---|---|
| 4,856,093 | 8/1989 | Mohr | 359/192 |
| 4,903,342 | 2/1990 | Yamazaki | 359/190 |
| 5,052,051 | 9/1991 | Naito et al. | 359/192 |

FOREIGN PATENT DOCUMENTS 0310174  4/1989  European Pat. Off. ............ 359/191

OTHER PUBLICATIONS

B. F. Jorgensen et al., "Analysis of Optical Amplifier . . . Systems with Optical Image Rejection Receivers", Journal of Lightwave Technology, vol. 10, No. 5, May 1992, pp. 660–671.

H. Shimizu et al., "Highly Practical Fiber Squeezer Polarization Controller", Journal of Lightwave Technology, vol. 9, No. 10, Oct. 1991, pp. 1217–1224.

B. J. Jorgensen et al., "Simple Method to Improve Dynamic Range of Optical Amplifiers in . . . Heterodyne Receivers", Electronics Letters, vol. 27, No. 7, Mar. 28, 1991, pp. 611–612.

*Primary Examiner*—David K. Moore
*Assistant Examiner*—Kinfe-Michael Negash
*Attorney, Agent, or Firm*—Sughrue, Mion, Zinn, Macpeak & Seas

[57] ABSTRACT

An optical heterodyne detector and receiver rejects an image signal stably regardless of disturbance. Signal light is passed through a first polarization controller and a polarization separator for conversion into linearly polarized light. The signal light and locally oscillated light that has passed through a second polarization controller are coupled with each other by an optical coupler. Light emitted from a first output port of the optical coupler is received to produce a first beat signal. Light emitted from a second output port of the optical coupler is applied to a polarization maintaining fiber whose own axis is inclined 45° to the polarization of the signal light. Light emitted from the polarization maintaining fiber is received to produce a second beat signal. The first polarization controller is operated to control the polarization of the signal light for maximizing the first beat signal at all times. The second polarization controller is operated to control the polarization of the locally oscillated light for maximizing the second beat signal at all times.

3 Claims, 5 Drawing Sheets

FIG. 2

INPUT POLARIZATION OF
POLARIZATION MAINTAINING FIBER 11

OUTPUT POLARIZATION OF
POLARIZATION MAINTAINING FIBER 11

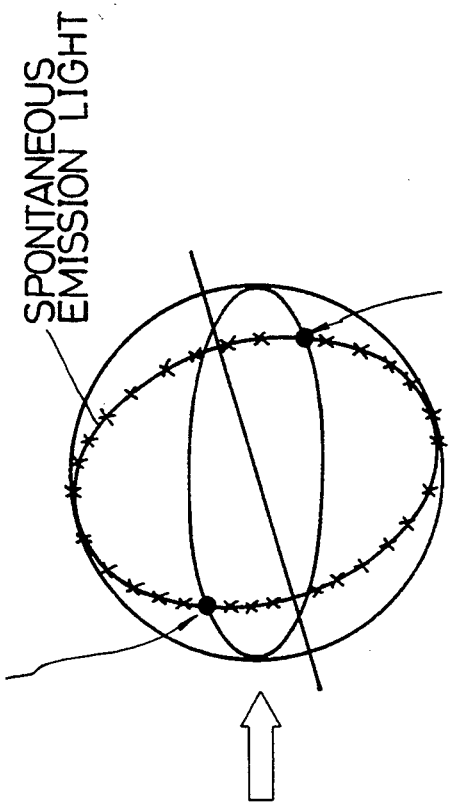

SPONTANEOUS EMISSION LIGHT ($f_0 - \Delta f$ OR $f_0 + 3\Delta f$)
SPONTANEOUS EMISSION LIGHT
LOCALLY OSCILLATED LIGHT 19 ($f_0$) AND SIGNAL LIGHT 1 ($f_0 + \Delta f$)

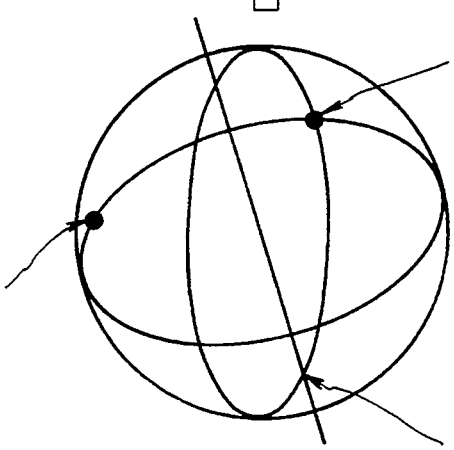

LOCALLY OSCILLATED LIGHT 19 ($f_0$)
SIGNAL LIGHT 1 ($f_0 + \Delta f$) AND SPONTANEOUS EMISSION LIGHT
OWN AXIS OF POLARIZATION MAINTAINING FIBER 11

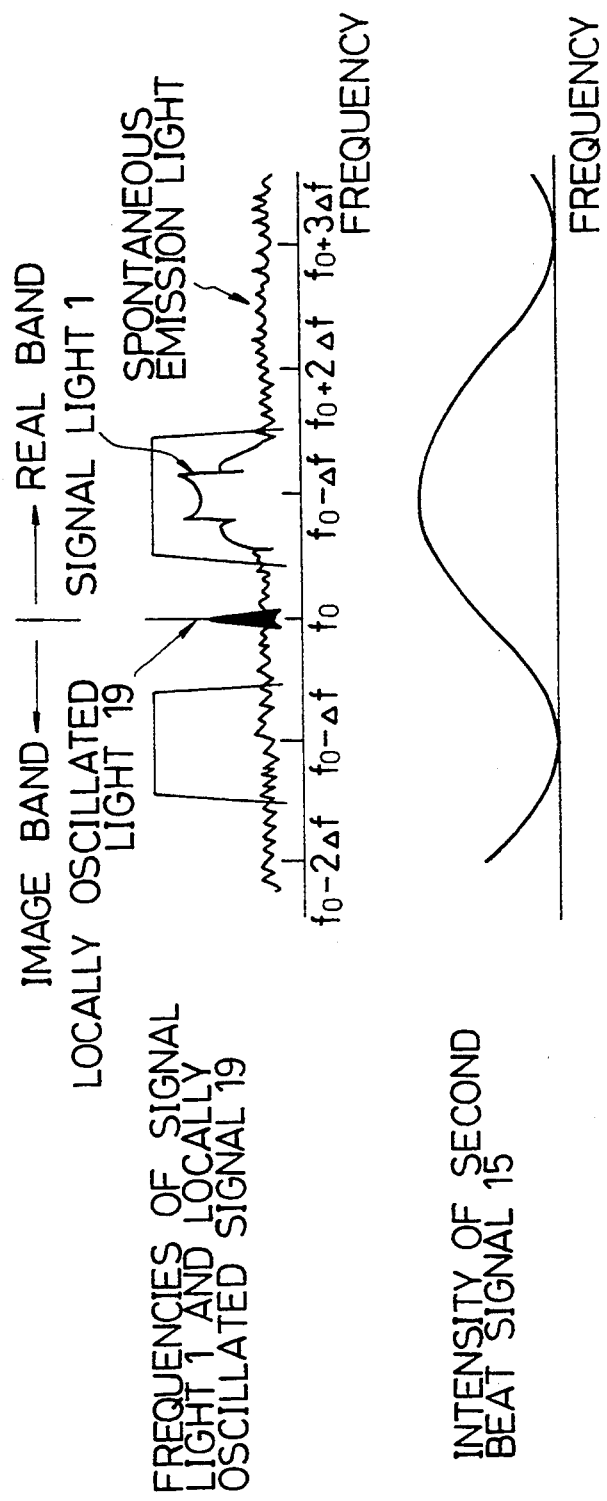

OPTICAL HETERODYNE DETECTOR AND RECEIVER

BACKGROUND OF THE INVENTION

Field of the Invention

The present invention relates to an optical heterodyne detector and receiver capable of rejecting an image signal.

Description of the Prior Art

Optical heterodyne detection and reception systems are effective in frequency selection in optical frequency division multiplexing (FDM) communication systems. Using image rejection receivers in optical heterodyne detection and reception systems, it is possible to reduce frequency intervals of signal light for increased system capacity. Image rejection receivers in long-distance optical amplification and repetition transmission systems are capable of removing spontaneous emission noise in an image band and phase noise produced by the nonlinear optical effect of optical fibers, resulting in an increased output range of optical repeaters used.

One conventional image rejection receiver employs a polarization maintaining fiber for optically rejecting image signals (B. F. Jorgensen et al., "Simple Method to Improve Dynamic Range of Optical Amplifiers in Coherent Optical Communication Systems with Heterodyne Receivers," Electronics Letters, Vol. 27, No. 7, pp. 611-612, 1991). According to this proposal, the polarization dispersion of a constant polarization fiber is used to convert real-band signal light and image-band signal light (or noise light) such that their polarization states are orthogonal to each other. By bringing the polarization of locally oscillated light into conformity with the polarization of real-band signal light, only a real band is received while the image band is rejected.

The conventional process, however, requires the polarization states of signal and locally oscillated light to be in strict conformity with 45°-linear polarization and circular polarization, with the result that the signal receiving condition may be impaired due to the vibration of optical fibers used and temperature changes.

SUMMARY OF THE INVENTION

It is an object of the present invention to provide an optical heterodyne detector and receiver capable of stably rejecting an image signal irrespective of disturbance.

According to an aspect of the present invention, signal light and spontaneous emission which are linearly polarized are applied to a polarization maintaining fiber, and the polarization of the spontaneous emission is converted into different polarizations of respective frequency components by polarization dispersion of the polarization maintaining fiber. When locally oscillated light used for optical heterodyne detection is applied as a circular polarization to the polarization maintaining polarization fiber, the polarization of the signal light and the polarization of the locally oscillated light emitted from the polarization maintaining fiber are in conformity with each other, maximizing a beat signal. Since the polarization of spontaneous emission having a frequency corresponding to an image signal is perpendicular to the polarization of the locally oscillated light, a beat signal is minimized, making it possible to reject the image signal. In order to bring the polarization of the signal light and the polarization of the spontaneous emission into conformity with each other and to maximize the signal light that passes through a polarization separator, the light to be applied to a polarization maintaining fiber is subjected to heterodyne detection to detect a first beat signal. The polarization of the signal light is controlled to maximize the first beat signal. Furthermore, in order to circularly polarize the locally oscillated light at all times, the polarization of the locally oscillated light is controlled to maximize a second beat signal at all times which is produced by heterodyne detection and reception of the light that has passed through the polarization maintaining fiber. As a result, the polarization of the applied locally oscillated light is automatically controlled into circular polarization, so that the image signal can stably be rejected. Polarization states at this time are shown in FIG. 2 of the accompanying drawings which represent the Poincaré sphere. If the length of the polarization maintaining fiber is adjusted such that the propagation delay time difference between two axes of its own is $\frac{1}{4}\Delta f$ ($\Delta f$ is the IF (intermediate frequency) of a heterodyne receiver), the linearly polarized signal light and the circularly polarized locally oscillated light to be applied to the polarization maintaining fiber have the same polarization state due to polarization dispersion when they are emitted from the polarization maintaining fiber. The spontaneous emission of 45° linear polarization has different polarizations of frequency components, and the spontaneous emission having a frequency that is $\pm \Delta 2$ f spaced from the signal light is a polarization perpendicular to the locally oscillated light. If the locally oscillated light has a frequency of f0 and the signal light has a frequency of f0+$\Delta$f, as shown in FIG. 3 of the accompanying drawings, no beat signal is produced, as the polarization of spontaneous emission of frequencies of f0−$\Delta$f and f0+3$\Delta$f is perpendicular to the polarization of the locally oscillated light. As a result, spontaneous emission noise having a frequency of f0−$\Delta$f as an image signal can be rejected. The relationship between the beat signal intensity obtained at this time and the frequency is also shown in FIG. 3. The beat signal intensity periodically varies according to a sine wave pattern with respect to the optical frequency, making the signal light maximum and the image signal minimum.

According to another aspect of the present invention, signal light and spontaneous emission which are linearly polarized are applied to a polarization maintaining polarization fiber, and the polarization of the spontaneous emission is converted into different polarizations of respective frequency components by polarization dispersion of the polarization maintaining fiber. Locally oscillated light used for optical heterodyne detection is combined with signal light that has passed through the polarization maintaining fiber so that their polarizations are brought into conformity with each other, and then subjected to heterodyne detection and reception. As a result, a beat signal of the signal light and the spontaneous emission is maximized. Since the polarization of spontaneous emission having a frequency corresponding to an image signal is perpendicular to the polarization of the locally oscillated light, a beat signal is minimized, making it possible to reject the image signal. In order to bring the polarization of the signal light and the polarization of the spontaneous emission into conformity with each other and to maximize the signal light that passes through a polarization separator, the polarization of the signal light is controlled to minimize, at all times, one outputted linearly polarized component separated by the polarization separator, thus making it possible to maximize a linearly polarized component perpendicular thereto. By controlling the polarization of the locally oscillated light to maximize, at all times, the beat signal produced by heterodyne detection and reception, the polarization of the signal light emitted from the polarization maintaining fiber and the polarization of the locally oscillated light are always brought into conformity with each other. Therefore, the image signal can be stably rejected.

According to still another aspect of the present invention, the same optical components as those of the second aspect of the invention are employed. Locally oscillated light used for optical heterodyne detection is coupled with signal light that has passed through the polarization maintaining fiber so that their polarizations are brought into conformity with each other, and then subjected to heterodyne detection and reception. However, the intensity of a beat signal produced by the heterodyne detection is employed as a monitor signal used for control to bring the polarization states of the signal light and spontaneous emission into conformity with linear polarization. That is, the polarization of the signal light is controlled to maximize the intensity of the beat signal at all times. Simultaneously, the polarization of the locally oscillated light is also controlled to maximize the intensity of the same beat signal at all times. Consequently, the polarized relationship, which is required to reject an image signal, between the signal light and the locally oscillated light is automatically satisfied, making it possible to reject the image signal stably.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is a diagram showing polarized states of signal light, spontaneous emission noise, and locally oscillated light, represented on the Poincaré sphere;

FIG. 3 is a diagram showing frequencies of signal light and locally oscillated light and the frequency-dependent intensity of a second beat signal;

DETAILED DESCRIPTION OF THE PREFERRED EMBODIMENTS

Figure 1:
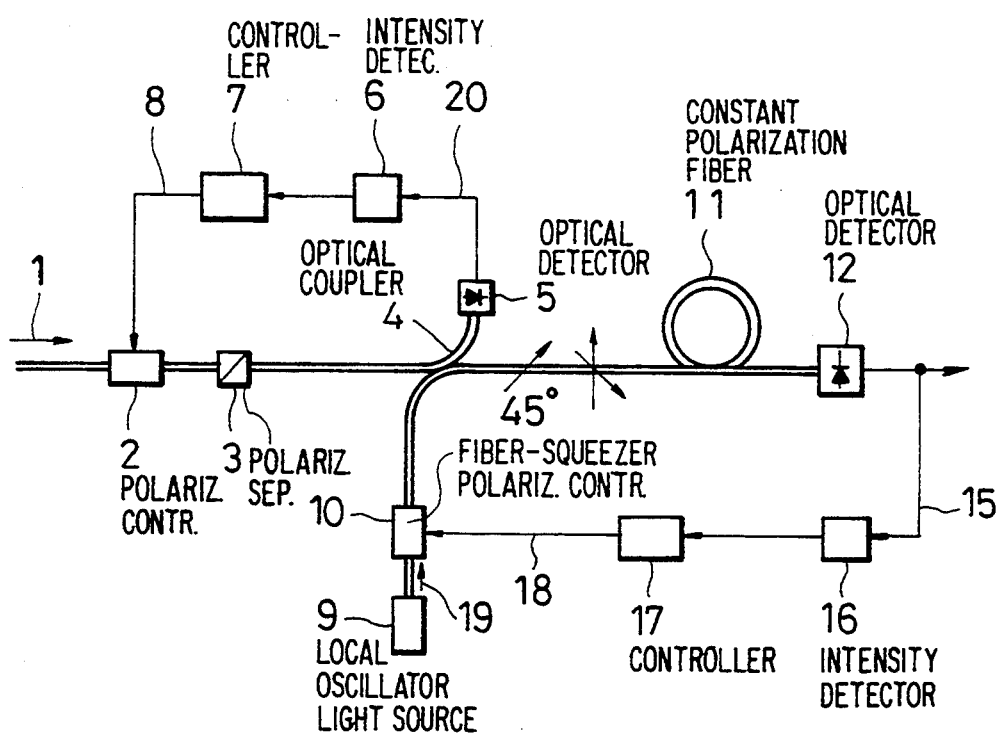
FIG. 1 is a block diagram of an optical heterodyne detector and receiver according to a first embodiment of the present invention.

As shown in FIG. 1, the principles of the present invention are embodied in a 2.5 Gb/s, continuous-phase frequency-shift keying (CPFSK) optical heterodyne detector and receiver in an optical amplification and repetition transmission system using optical amplifiers.

Figure 4:
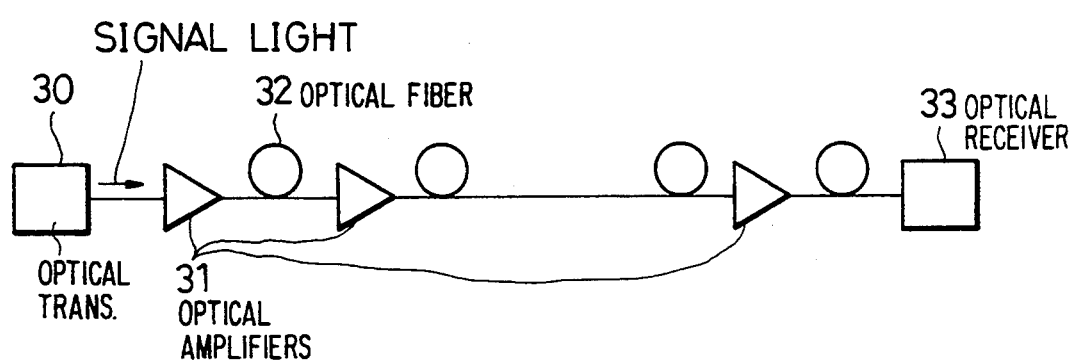
FIG. 4 is a block diagram of an optical amplification and repetition transmission system.

FIG. 4 is a schematic representation of the optical amplification and repetition transmission system. The optical amplification and repetition transmission system has optical amplifiers 31 for amplifying signal light from an optical transmitter 30, an optical fiber 32 for repeating and transmitting the signal light over a long distance, and an optical receiver 33 for receiving the transmitted signal light.

In FIG. 1, signal light 1 of a wavelength of 1.55 $\mu$m to which spontaneous emission noise has been added by optical amplifiers is applied to a first polarization controller 2. The first polarization controller 2 comprises a fiber squeezer polarization controller for applying a side pressure to the optical fiber to vary the polarization state of the signal light. The first polarization controller 2 is composed of five fiber squeezers, and can convert the applied polarized light into any desired polarized light and can also perform endless polarization tracking control (H. Shimizu et al., "Highly Practical Fiber Squeezer Polarization Controller," Journal of Lightwave Technology, Vol. 9, No. 10, pp. 1217–1224, 1991).

The light emitted by the first polarization controller 2 is applied to a polarization separator 3, which brings the polarization of the signal light 1 and the polarization of the spontaneous emission noise into conformity with each other. A local oscillator light source 9 which oscillates at a frequency that is 5 GHz lower than the signal light applies locally oscillated light 19 to a second fiber squeezer polarization controller 10. The locally oscillated light 19 from the second polarization controller 10 is applied to an optical coupler 4 that couplers the locally oscillated light 19 with the signal light 1 from the polarization separator 3. The optical coupler 4 has two output ports. The light emitted from one of the two output ports of the optical coupler 4 is applied to a first optical detector 5, which detects a first beat signal 20. The intensity of the first beat signal 20 is detected by an intensity detector 6 and supplied to a first controller 7 comprising a microprocessor. The first controller 7 applies a control signal 8 to control the first polarization controller 2 to maximize the output signal of the intensity detector 6. In this embodiment, in order to control the first polarization controller 2 to maximize the output signal of the intensity detector 6, the first controller 7 employs the hill-climbing method to slightly vary the polarization state to add perturbation for finding a maximum value.

The light emitted from the other output port of the optical coupler 4 is applied to a constant polarization fiber 11. The constant polarization fiber 11 is arranged such that its own axis is inclined 45° to the main axis of the signal light that is linearly polarized. The length of the polarization maintaining fiber 11 is about 30 m such that a propagation delay time between two of its own axes is 50 ps. The output light from the polarization maintaining fiber 11 is applied to a second optical detector 12, which produces a second beat signal 15 with an IF (intermediate frequency) of 5 GHz. The second beat signal 15 is then applied to an intensity detector 16, which detects the intensity of the second beat signal 15 and supplies the intensity to a second controller 17. The second controller 17 applies a control signal 18 to control the second polarization controller 10 to maximize the output signal of the intensity detector 16.

When the two controllers 7, 17 are in simultaneous operation according to the arrangement shown in FIG. 1, the spontaneous emission noise in an image band is rejected thereby to improve both the S/N ratio and the reception sensitivity by about 2.5 dB. When signal light is repeated and transmitted over a distance of 1000 km, the repeated optical output that can be used ranges from 0 to +5 dBm with an ordinary heterodyne receiver, but is in the range of from −2.5 to +7.5 dBm with the optical heterodyne detector and receiver according to the first embodiment of the present invention. Furthermore, even when disturbance is applied to the optical fiber while the signal light is being transmitted therethrough, the transmission characteristics are not degraded, allowing stable reception of the signal light. Therefore, the effectiveness of the principles of the first embodiment are confirmed.

Figure 5:
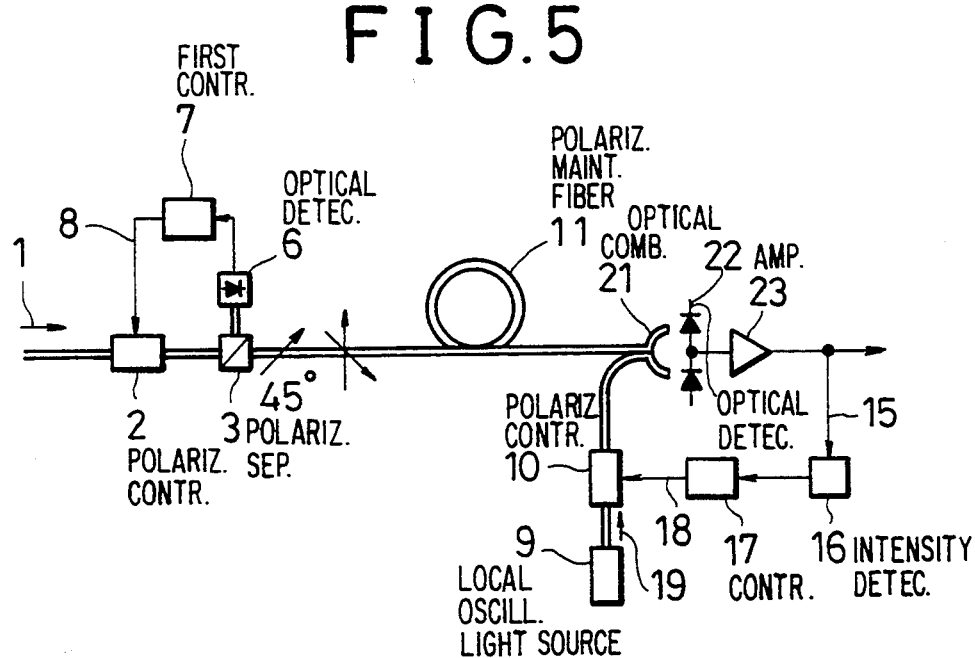
FIG. 5 is a block diagram of an optical heterodyne detector and receiver according to a second embodiment of the present invention.

FIG. 5 shows an optical heterodyne detector and receiver according to a second embodiment of the present invention. In the second embodiment, after signal light 1 has passed through a polarization maintaining fiber 11, it is combined with locally oscillated light 19. As a result, an optical receiver may comprise a balanced optical receiver for removing an intensity noise component from the locally oscillated light 19. In order to bring the polarization of the signal light 1 and the polarization of spontaneous emission noise, a first linearly polarized component out of two perpendicular linearly polarized components that have been separated by a polarization separator 3 is applied to a first optical detector 5, which applies a detected output to a first controller 17. The first controller 7 applies a control signal 8 to control a first polarization controller 2 to minimize the output light from the first optical detector 5. As a result, the second linearly polarized component perpendicular to the first linearly polarized component detected by the first optical detector 5 is maximized at all times.

When the signal light 1 and the spontaneous emission noise that have been linearly polarized are applied to a polarization maintaining fiber 11 at an angle of 45° to its own axis, the spontaneous emission noise outputted from the polarization maintaining fiber 11 is converted into a different polarization state depending on the frequency component. The polarization of the locally oscillated light 19 is controlled by a second polarization controller 10 such that it is in conformity with the polarization of the signal light 1 emitted from the polarization maintaining fiber 11. The signal light 1 and the locally oscillated light 19 are combined with each other by an optical combiner 21. The optical coupler 21 applies its output light to a balanced optical receiver composed of two series of connected optical detectors 22 (dual-pin photodiodes) and an amplifier 23, which produces a beat signal 15. The beat signal 15 is applied to an intensity detector 16, which detects and supplies the intensity of the beat signal 15 to a second controller 17. The second controller 17 applies a control signal 18 to enable the second polarization controller 10 to control the polarized state of the locally oscillated light 19 for maximizing the intensity of the beat signal 15. As a consequence, the signal light 1 is received at its maximum level at all times. Inasmuch as the spontaneous emission noise having a frequency of f0−Δf as an image signal is perpendicular to the polarization of the locally oscillated light 19, no beat signal is produced.

When the two controllers 7, 17 are in simultaneous operation according to the arrangement shown in FIG. 5, the spontaneous emission noise in an image band is rejected thereby to improve both the S/N ratio and the reception sensitivity by about 2.5 dB. When signal light is repeated and transmitted over a distance of 1000 km, the repeated optical output that can be used ranges from 0 to +5 dBm with an ordinary heterodyne receiver, but is in the range of from −2.5 to +7.5 dBm with the optical heterodyne detector and receiver according to the second embodiment of the present invention. Furthermore, even when disturbance is applied to the optical fiber while the signal light is being transmitted therethrough, the transmission characteristic are not degraded, allowing stable reception of the signal light. Therefore, the effectiveness of the principles of the second embodiment is confirmed.

Figure 6:
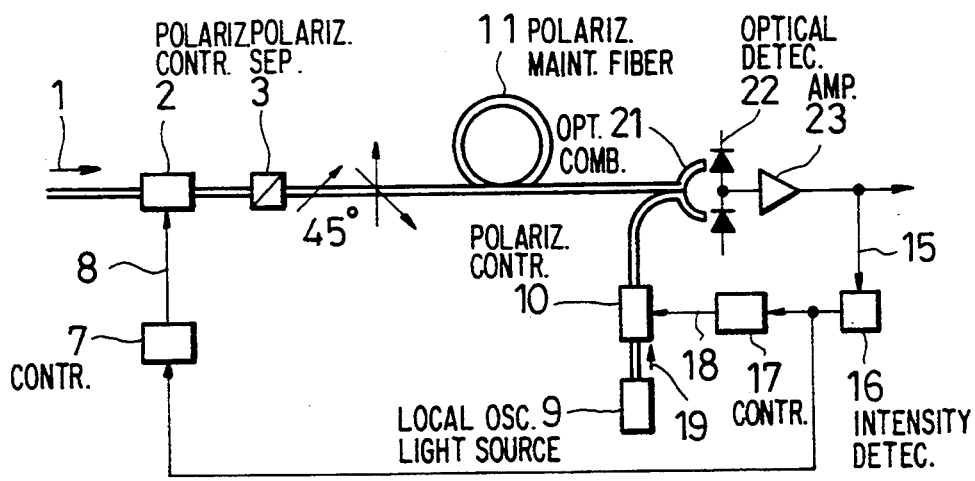
FIG. 6 is a block diagram of an optical heterodyne detector and receiver according to a third embodiment of the present invention.

FIG. 6 shows an optical heterodyne detector and receiver according to a third embodiment of the present invention. In the third embodiment, after signal light 1 has passed through a polarization maintaining fiber 11, it is combined with locally oscillated light 19, as in the second embodiment. However, a monitor signal for controlling a first polarization controller 2 is the same as a beat signal intensity that is used to control a second polarization controller 10. More specifically, the output intensity of an intensity detector 16 which detects the intensity of a beat signal 15 is divided into two signals that are applied respectively to first and second controllers 7, 17. The first controller 7 controls the first polarization controller 2 and the second controller 17 controls the second polarization controller 10 such that the output intensity of the intensity detector 16 is maximized. Control rates of the first and second controllers 7, 17 are set to 1 ms and 3 ms, respectively, to prevent a controlled condition from becoming unstable.

When the two controllers 7, 17 are in simultaneous operation according to the arrangement shown in FIG. 6, the spontaneous emission noise in an image band is rejected thereby to improve both the S/N ratio and the reception sensitivity by about 2.5 dB. When signal light is repeated and transmitted over a distance of 1000 km, the repeated optical output that can be used ranges from 0 to +5 dBm with an ordinary heterodyne receiver, but is in the range of from −2.5 to +7.5 dBm with the optical heterodyne detector and receiver according to the second embodiment of the present invention. Furthermore, even when disturbance is applied to the optical fiber while the signal light is being transmitted therethrough, the transmission characteristics are not degraded, allowing stable reception of the signal light. Therefore, the effectiveness of the principles of the third embodiment are confirmed.

As described above, according to the present invention, an image signal can stably be rejected without depending on disturbance.

While the polarization controllers 2, 10 comprise fiber squeezer polarization controllers in the illustrated embodiments, they may comprise polarization controllers of any of various other types such as a waveguide polarization controller made of lithium niobate or a wavelength-plate rotary polarization controller. Furthermore, the second polarization controller 10 may be positioned to receive the signal light 1 rather than to receive the locally oscillated light 19 as shown. More specifically, the second polarization controller 10 may be connected to the output terminal of the polarization separator 3 in the first embodiment, and may be connected to the output terminal of the constant polarization fiber 11 in the second and third embodiments.

Although certain preferred embodiments of the present invention have been shown and described in detail, it should be understood that various changes and modifications may be made therein without departing from the scope of the appended claims.

What is claimed is:

1. An optical heterodyne detector and receiver for rejecting an image signal, comprising:

a first polarization controller for varying a polarization state of received signal light;

a polarization separator for receiving signal light outputted from said first polarization controller and bringing the polarization of said signal light and the polarization of noise light into conformity with linear polarization;

a local oscillator light source for oscillating in a single mode;

a second polarization controller for varying a polarization state of locally oscillated light outputted from said local oscillator light source;

an optical coupler for coupling the signal light outputted from said polarization separator and the locally oscillated light outputted from said second polarization controller;

a first optical detector for receiving output light outputted from a first output port of said optical coupler and detecting a first beat signal therefrom;

a first intensity detector for receiving said first beat signal from said first optical detector, and for detecting a first intensity signal of said first beat signal;

a first controller for receiving said first intensity signal of said first beat signal, and for controlling said first polarization controller to maximize sail first intensity signal of said first beat signal at all times;

a polarization maintaining fiber having its own axis inclined 45° with respect to a main axis of the polarization state of the signal light outputted from a second output port of said optical coupler;

a second optical detector for receiving output light from said polarization maintaining fiber and detecting a second beat signal therefrom;

a second intensity detector for receiving said second beat signal from said second optical detector, and for detecting a second intensity signal of said second beat signal; and a second controller for receiving said second intensity signal of said second beat signal, and for controlling said second polarization controller to maximize said second intensity signal of said second beat signal at all times with a different control speed compared with a control speed of said first controller.

2. An optical heterodyne detector and receiver for rejecting an image signal, comprising:

a first polarization controller for varying a polarization state of received signal light;

a polarization separator for receiving signal light outputted from said first polarization controller and separating the received signal light into a first linearly polarized signal light and a second linearly polarized signal light that are perpendicular to each other;

a first optical detector for detecting the intensity of said first linearly polarized signal light separated by said polarization separator, and for outputting a first intensity signal;

a first controller for receiving said first intensity signal and for controlling said first polarization controller to minimize the intensity detected by said first optical detector at all times;

a polarization maintaining fiber for receiving said second linearly polarized signal light separated by said polarization separator, said polarization maintaining fiber having its own axis inclined 45° with respect to a main axis of the polarization state of said second linearly polarized signal light;

a local oscillator light source for oscillating in a single mode;

a second polarization controller for varying a polarization state of locally oscillated light outputted from said local oscillator light source;

an optical coupler for coupling signal light outputted from said polarization maintaining fiber and the locally oscillated light outputted from said second polarization controller;

a second optical detector for receiving output light from said optical coupler and detecting a beat signal therefrom;

an intensity detector for receiving said beat signal from said second optical detector and detecting an intensity signal of said beat signal; and a second controller for receiving said intensity signal of said beat signal, and for controlling said second polarization controller to maximize the intensity of said beat signal at all times with a different control speed compared with a control speed of said first controller.

3. An optical heterodyne detector and receiver for rejecting an image signal, comprising:

a first polarization controller for varying a polarization state of received signal light;

a polarization separator for receiving signal light outputted from said first polarization controller and bringing the polarization of said signal light and the polarization of noise light into conformity with linear polarization;

a polarization maintaining fiber for receiving said signal light outputted from said polarization separator, said polarization maintaining fiber having its own axis inclined 45° with respect to a main axis of the polarized state of said signal light;

a local oscillator light source for oscillating in a single mode;

a second polarization controller for varying a polarization state of locally oscillated light outputted from said local oscillator light source;

an optical coupler for coupling signal light outputted from said polarization maintaining fiber and the locally oscillated light outputted from said second polarization controller;

an optical detector for receiving output light from said optical coupler and detecting a beat signal therefrom;

an intensity detector for receiving said beat signal from said optical detector and detecting an intensity signal of said beat signal;

a first controller for receiving said intensity signal of said beat signal, and for controlling said first polarization controller to maximize said intensity signal of said beat signal at all times; and a second controller for receiving said intensity signal of said beat signal, and for controlling said second polarization controller to maximize said intensity signal of said beat signal at all times with a different control speed compared with a control speed of said first controller.

* * * * *